(12) United States Patent
Wang (10) Patent No.: US 12,208,748 B2
(45) Date of Patent: Jan. 28, 2025

(54) CAMERA WITH A HOUSING FOR SHIELDING ELECTROMAGNETIC RADIATION AND MOTOR VEHICLE

(71) Applicant: VALEO INTERIOR CONTROLS (SHENZHEN) CO. LTD, Shenzhen (CN)

(72) Inventor: Haidong Wang, Shenzhen (CN)

(73) Assignee: VALEO INTERIOR CONTROLS (SHENZHEN) CO. LTD, Shenzhen (CN)

( * ) Notice: Subject to any disclaimer, the term of this patent is extended or adjusted under 35 U.S.C. 154(b) by 134 days.

(21) Appl. No.: 17/776,114

(22) PCT Filed: Nov. 12, 2020

(86) PCT No.: PCT/CN2020/128286
§ 371 (c)(1),
(2) Date: May 11, 2022

(87) PCT Pub. No.: WO2021/093800
PCT Pub. Date: May 20, 2021

(65) Prior Publication Data
US 2022/0388458 A1  Dec. 8, 2022

(30) Foreign Application Priority Data

Nov. 12, 2019 (CN) .......................... 201911099182.1

(51) Int. Cl.
*B60R 11/04* (2006.01)
*G03B 17/02* (2021.01)
(Continued)

(52) U.S. Cl.
CPC .............. *B60R 11/04* (2013.01); *G03B 17/02* (2013.01); *H01R 13/2414* (2013.01); *H01R 13/502* (2013.01); *H01R 13/6593* (2013.01)

(58) Field of Classification Search
CPC .............. H01R 13/6593; H01R 13/502; H01R 13/2414; G03B 17/02; B60R 11/04;
(Continued)

(56) References Cited

U.S. PATENT DOCUMENTS

| | | | |
|---|---|---|---|
| 2017/0271819 A1 | 9/2017 | Hehir et al. | |
| 2019/0143907 A1* | 5/2019 | Byrne | H01R 12/716 |
| | | | 348/148 |
| 2020/0194937 A1* | 6/2020 | Maesoba | H01R 13/193 |

FOREIGN PATENT DOCUMENTS

| | | |
|---|---|---|
| CN | 205488716 U | 8/2016 |
| CN | 107005002 A | 8/2017 |

(Continued)

OTHER PUBLICATIONS

International Search Report and Written Opinion issued in corresponding International Patent Application No. PCT/CN2020/128286, mailed on Jan. 29, 2021 (9 pages).

(Continued)

*Primary Examiner* — Xi Wang
(74) *Attorney, Agent, or Firm* — Osha Bergman Watanabe & Burton LLP (57) ABSTRACT

The invention relates to a camera (2) for a motor vehicle (1), including a housing (5) configured to shield electromagnetic radiation at least in certain areas, including a circuit board (16) disposed in the housing (5), and including an interface device (11) for connecting the camera (2) to the motor vehicle (1), wherein the interface device (11) is electrically connected to the circuit board (16), wherein the interface device (11) includes a coaxial plug (12) with an inner conductor (13) and an outer conductor (14) and the camera (2) has a connecting device (17) for electrically connecting the outer conductor (14) with the housing (5), wherein the connecting device (17) comprises at least one separate and electrically conductive rubber piece (18), which is arranged (Continued)

between the outer conductor (14) and the housing (5) and contacts the outer conductor (14) and the housing (5).

7 Claims, 6 Drawing Sheets

(51) Int. Cl.
*H01R 13/24* (2006.01)
*H01R 13/502* (2006.01)
*H01R 13/6593* (2011.01)

(58) Field of Classification Search
CPC .......... G02B 13/001–009; H05K 2201/10121; H05K 7/00–2099; H05K 5/00–069; H05K 9/00–0098; B60Y 2400/3015; B60W 2420/403; H01L 27/4618
USPC ........................................................ 348/374
See application file for complete search history.

(56) References Cited

FOREIGN PATENT DOCUMENTS

| CN | 206480868 U | 9/2017 |
| CN | 107565246 A | 1/2018 |
| CN | 207459272 U | 6/2018 |
| EP | 3079347 A1 | 10/2016 |
| JP | 3041589 B2 | 5/2000 |
| JP | 2005-216702 A | 8/2005 |
| JP | 2016-149206 A | 8/2016 |
| JP | 2018-500733 A | 1/2018 |

OTHER PUBLICATIONS

Office Action issued is corresponding JP Application No. 2022-527860, dated Jul. 21, 2023. (8 pages with English translation).
Extended European Search Report issued in European Application No. 20886212.8, dated Oct. 26, 2023 (51 pages).

* cited by examiner

CAMERA WITH A HOUSING FOR SHIELDING ELECTROMAGNETIC RADIATION AND MOTOR VEHICLE

The invention relates to a camera for a motor vehicle with a housing configured to shield electromagnetic radiation at least in certain areas, including a circuit board disposed in the housing and including an interface device for connecting the camera to the motor vehicle. The interface device is electrically connected to the circuit board. In addition, the invention relates to a motor vehicle with at least one camera.

Cameras for motor vehicles are known from the prior art. Thus, these cameras mostly have a housing, a circuit board and an interface device for connecting the camera to the motor vehicle. Electromagnetic radiation is emitted from further components of the camera such as for example an imaging chip, a video serializer or a current supply. This is undesired and is attempted to shield as possible, for example by the housing, to increase an electromagnetic compatibility (EMC). The electromagnetic compatibility characterizes the usually desired condition that technical appliances do not interfere with each other by undesired electromagnetic effects.

It is the object of the invention to provide a camera, by which the electromagnetic compatibility can be more reliably achieved. It is also the object to form a motor vehicle with such a camera.

According to the invention, this object is solved by a camera as well as by a motor vehicle having the features according to the respective independent claims.

A camera according to the invention for a motor vehicle includes a housing configured to shield electromagnetic radiation at least in certain areas, a circuit board disposed in the housing and an interface device for connecting the camera to the motor vehicle. The interface device is electrically connected to the circuit board. It is provided that the interface device includes a coaxial plug with an inner conductor and an outer conductor and the camera has a connecting device for electrically connecting the outer conductor to the housing.

By the camera according to the invention for the motor vehicle, it becomes possible to ensure the electromagnetic compatibility. In addition, the housing can be particularly effectively electrically connected to the outer conductor by the connecting device. The connecting device also allows reliable compensation for manufacturing inaccuracies of the housing and/or the outer conductor and/or the circuit board. Also, the circuit board can be retained at least partially by the connecting device and thus, for example, retained at an axial position with regard to a longitudinal axis of the coaxial plug. Thus, the housing is for example connected to a ground potential of the circuit board via the outer conductor. By connecting the housing to the ground potential, the housing can particularly effectively shield the electromagnetic radiation. Thus, it can for example occur that the coaxial plug is not concentrically disposed in an opening of the housing. In order to counteract this case of manufacturing inaccuracy, the connecting device is used. The coaxial plug or a coaxial connector serves for detachably connecting coaxial cables. The coaxial plug is coaxially designed like the coaxial cable to be able to provide a low electromagnetic interference and a good electrical shielding. Thus, the coaxial plug can for example be a so called FAKRA connector (FAKRA—Fachkreis Automobil). In particular, the coaxial plug can be formed as a high speed data plug for high speed data transmission.

In particular, the outer conductor of the coaxial plug is formed in the manner of a hollow cylinder. The inner conductor is preferably arranged within the outer conductor. The outer conductor and the inner conductor can be arranged coaxially to each other. However, a longitudinal axis of the inner conductor can also be spaced from a longitudinal axis of the outer conductor, in which case it is not coaxial. The inner conductor in particular features a pin-like form.

The coaxial plug can also comprise an outer conductor and a plurality of inner conductors. In that case, a longitudinal axis of the outer conductor and a longitudinal axis of the respective inner conductor are preferably spaced apart from each other and thus not coaxial. The outer conductor encloses the at least one inner conductor at least partially, in particular completely. In particular, the outer conductor is connected to a first electric potential and the at least one inner conductor is connected to a second electric potential which is different from the first electric potential. The first potential is in particular a ground potential.

In the context of the invention, a coaxial plug in particular denotes a plug which features an outer conductor according to the above characteristics.

In particular, it is provided that the connecting device is formed elastically deformable. By the elastic deformability of the connecting device, deviations in the manufacturing accuracy of the housing and/or the coaxial plug can be compensated for. Thus, despite the manufacturing inaccuracy and deviations of the dimensions of the housing and/or the coaxial plug, respectively, the electrical connection of the outer conductor of the coaxial plug to the housing can be reliably provided.

The connecting device comprises at least one separate and electrically conductive rubber piece. The rubber piece is a component that is separate from the inner conductor and the outer conductor. The rubber piece is a component that is also separate from the housing. The rubber piece is arranged between the outer conductor and the housing and is contacting the outer conductor and the housing. By such electrically conductive rubber piece the electromagnetic compatibility can be improved. The rubber piece, viewed as such in comparison with the complex formation from the prior art comprising a plurality of spring elements, has a considerably simpler setup. Moreover the electrical rubber piece, viewed as such, is easier to be manufactured and can also be installed more precisely in position between the outer conductor and the housing. Thereby, on the one hand, the contacting with the outer conductor, on the one hand, and the housing, on the other hand, is improved, in particular facilitated across larger surfaces. Also this permanent position precision and also stability of the shape of the rubber piece is thereby improved in comparison with the prior art.

Preferably it is envisaged that the rubber piece is configured as externally fully circumferential ring. In particular the rubber piece in this connection is quasi configured as tube part. It thus represents a cylinder part with an axial cut-out. The rubber piece is in particular only a hollow cylinder. This design is shape-specifically very simple. Thereby both manufacture and mounting are very simple. In particular the rubber piece by such shape design can also be regarded as mechanically stable support part. It is true that the rubber piece advantageously is designed to be elastically deformable to a certain degree, however, in this regard only to a relatively small degree. An elastic deformability, which changes the basic shape of the rubber piece, as has been explained in the above, in particular essentially changed, is not envisaged. Thereby the rubber piece also has a corresponding stability. In the very process of inserting the rubber piece during the subsequent installation thereby undesired deformations can be avoided. The position precision of the rubber piece is high due to this shape design and design of the reduced elasticity. The rubber piece is only designed as such ring. Further integrated components, which change in shape in this regard, are not provided. Preferably, this ring in the axial direction has a height, which is larger than a radial measurement of a front side or a rear side of this ring.

Preferably, it is envisaged that the ring is dimensioned across its entire height, which is dimensioned in the direction of the longitudinal axis of the coaxial plug, has an axially oriented barrel wall. The ring thus is not of a conical or otherwise tapered design. By such design of the ring a particularly precise fit between the outer conductor and the housing can be achieved.

Preferably, it is envisaged that the rubber piece surrounds the outer conductor and contacts the outer surface of the outer conductor. In particular this is configured across the entire height of the rubber piece. Thereby the position-secured arrangement relative to the outer conductor is facilitated.

Preferably, it is envisaged that the outer conductor extends outwardly through an opening in the housing and a boundary wall of the housing bounding the opening is arranged at a distance from the outer side so that an axial gap between the boundary wall and the outer side is formed.

In an advantageous embodiment it is envisaged that the rubber piece has a top side which faces the gap and directly contacts one gap end. Thereby the gap towards the interior of the housing is completely covered by the top side. This top side of the rubber piece can also be referred to as front side. This radial dimension of this top side or front side, as it has already been set out in an advantageous embodiment above, is smaller than the axial height of the barrel wall.

Preferably, it is envisaged that the rubber piece sits on a socket-like partial element of the outer conductor and is contacted with an electrical contact surface of the socket-like partial element. This is effected in particular with a rear side of the rubber piece. Also the radial dimensions of this rear side are smaller than the height of the barrel wall. In particular it is envisaged that the surface of the rear side is equal to the surface of the top side or the front side. By such a design, in which this rubber piece with its rear side surface contacts the contact surface, on the one hand an electrical contacting across as large as possible a surface can occur. On the other hand, thereby also the mechanical fit of the rubber piece on the outer conductor is improved.

In particular it is envisaged that the rubber piece is configured as solid body. Thereby the manufacture is simplified and the stability of shape increased. In particular by such design of the rubber piece the deformation robustness is raised. Thereby neither during mounting nor in the mounted final state undesired deformations occur, which cause the electric contacting between outer conductor and the housing to be reduced. In particular by such design of the rubber piece the electromagnetic compatibility of the camera is improved in particular in this area.

Furthermore, it is preferably provided that the connecting device surrounds the outer conductor at least in certain areas. This means that the connecting device is preferably disposed around the outer conductor. Thus, the connecting device is preferably located on the side of the outer conductor facing away from the inner conductor. It is advantageous that the coaxial plug can therefore be connected to the motor vehicle in a manner undisturbed or unimpeded by the connecting device. Furthermore, the outer conductor can be prevented from establishing an electrical connection to the inner conductor via the connecting device. In particular, thereby, the ground potential of the outer conductor does not get into connection with the inner conductor. In addition, an assembly of the connecting device can be simply performed.

Furthermore, it can be provided that the outer conductor includes a first partial element and a second partial element, which is disposed between the first partial element and the circuit board, wherein a first outer radius of the first partial element is less than a second outer radius of the second partial element. The first partial element in particular establishes the connection to a plug connected to the coaxial plug in order to for example connect the camera to the motor vehicle. The second partial element has a contact area extending in radial direction with respect to the coaxial plug due to the larger second outer radius. The contact area is preferably provided to set the connecting device on the side of the outer conductor. A particularly reliable electrical connection of the outer conductor to the housing can be provided by the second partial element.

In a further embodiment, it is preferably provided that the housing has a ring shaped receiving element on an inner side facing the circuit board, in which the connecting device is disposed at least in certain areas and which is electrically connected to the connecting device. Thus, the receiving element of the housing can for example ensure that the connecting device has a secure retention at the location, at which the connecting device is connected to the housing. This can have an advantage in the assembly of the housing and provide a secure electrical connection of the outer conductor to the housing. By the receiving element, a surface, by which the housing is connected to or in contact with the connecting device, can be increased. The electrical connection of the outer conductor to the housing and thus the electrical connection of the housing to the ground potential of the circuit board can therefore be particularly reliably and robustly provided.

In a further embodiment, it can be provided that the housing includes a first housing part and a second housing part. Thus, the first housing part is electrically connected to the outer conductor and thus to the ground potential of the circuit board via the connecting device. The second housing part is in turn electrically connected to the first housing part for example via screws and thus also electrically connected to the ground potential. Thus, the entire housing is preferably electrically connected to the ground potential and can particularly effectively shield the electromagnetic radiation from the components within the camera and prevent it from exiting the housing. In the same manner, by the housing, electromagnetic radiation can be prevented from entering the housing from the outside. In this manner, the electromagnetic compatibility can be achieved.

For example, the housing can be manufactured from aluminum. Additionally, the interface device can have an electrically insulating element manufactured from plastic, for example. However, the interface device can also be formed without the electrically insulating element. The interface device in particular serves for data transfer between the camera and a communication bus of the motor vehicle. The camera can also be supplied with electrical energy from an on-board network of the motor vehicle via the interface device.

Furthermore, it can be provided that the interface device is configured as a high-speed data plug, with a data transmission rate of at least 100 Mbit/s, in particular with a data transmission rate of at least 1 Gbit/s. In particular, the coaxial plug can be formed as a high speed data plug. Thus, the high speed data plug is for example a component of a connector system providing an impedance-controlled 100 Ohm connection to transfer data with high speed. The high speed data plug can for example be based on a star quad principle and feature four inner conductors. Spurious signals by crosstalk and external interference sources are thus suppressed. Thus, a particularly effective connection with little spurious signals is advantageous.

In particular, it is provided that the outer conductor is electrically connected to a ground potential of the camera. The ground potential can for example be provided by the circuit board and/or by the motor vehicle. By electrically connecting the outer conductor to the ground potential of the camera, the housing of the camera can also be electrically connected to the ground potential of the camera by the connecting device. Thus, hereby, the electromagnetic compatibility is also again ensured.

The invention also includes a motor vehicle with a camera according to the invention or an advantageous implementation thereof. The motor vehicle is in particular formed as a passenger car.

The preferred embodiments presented with respect to the camera according to the invention and the advantages thereof correspondingly apply to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Below, embodiments of the invention are explained in more detail based on schematic drawings.

These show in.

Figure 1:
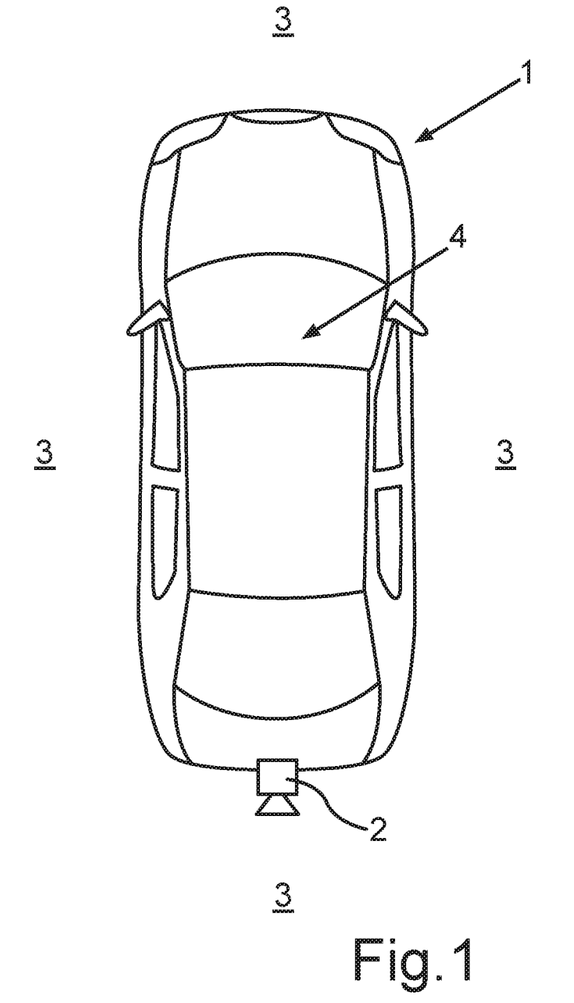
FIG. 1 in schematic plan view an embodiment of a motor vehicle according to the invention with a camera.

In FIG. 1, a plan view of a motor vehicle 1 with a camera 2 according to an embodiment of the invention is schematically illustrated. The arrangement of the camera 2 on the motor vehicle 1 is arbitrary, however preferably such that an environmental region 3 of the motor vehicle 1 and/or an internal area 4 of the motor vehicle 1 can be captured. The motor vehicle 1 can also include multiple such cameras 2. The camera 2 can be a CMOS (complementary metal-oxide-semiconductor) camera or else a CCD (charge-coupled device) camera or any image capturing device.

Figure 2:
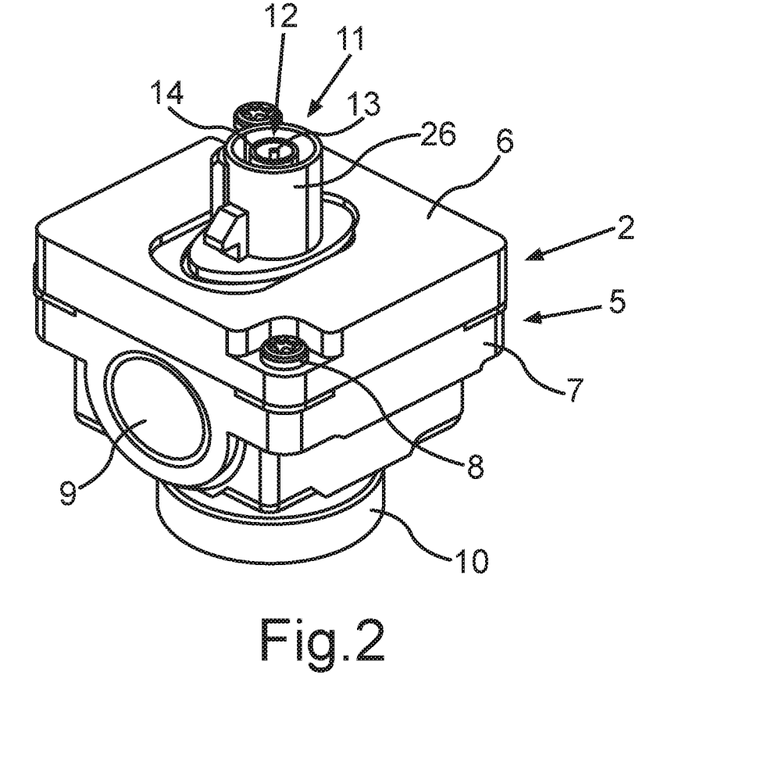
FIG. 2 a perspective view of the camera with a housing and an interface device including a coaxial plug.

FIG. 2 shows a perspective view of the camera 2 in a first embodiment. In this embodiment, the camera 2 includes a housing 5 with a first housing part 6 and a second housing part 7. The first housing part 6 and the second housing part 7 are connected to each other by at least one screw 8 according to the embodiment. The first housing part 6 and/or the second housing part 7 can for example be manufactured from aluminum. According to the embodiment, the camera 2 furthermore includes a valve 9 and a lens 10.

In addition, the camera 2 has an interface device 11. The interface device 11 serves for data transfer and can be connected to a corresponding interface of a communication bus of the motor vehicle 1. The interface device 11 includes a coaxial plug 12 with an inner conductor 13 and an outer conductor 14. In addition, the interface device 11 has a connector envelope 26, which can for example be manufactured from plastic. The connector envelope 26 is in particular disposed outside of the housing 5. The connector envelope 26 for example serves for locking a cable harness of the motor vehicle 1, by which the camera 2 can be connected to the motor vehicle 1.

Figure 3:
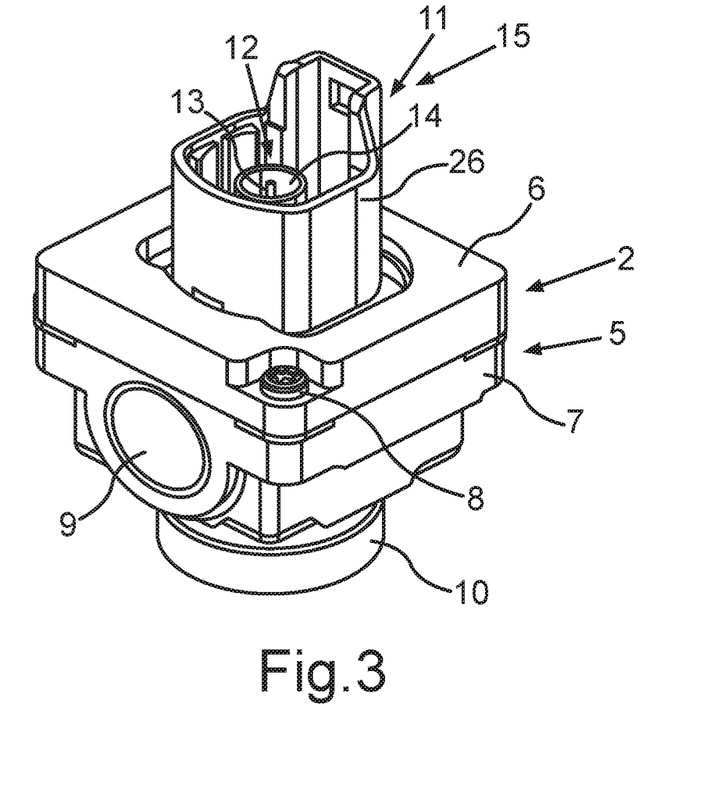
FIG. 3 a perspective view of a further embodiment of the camera with the housing and an interface device, which is configured as a high-speed data plug.

FIG. 3 shows a perspective view of the camera 2 in a second embodiment. Here too, the camera 2 has the housing 5 with the first housing part 6 and the second housing part 7. The first housing part 6 and the second housing part 7 are also connected by the screw 8. According to FIG. 3, the interface device 11 is formed as a high-speed data plug 15. The high-speed data plug 15 is for example configured for high-speed data transfer.

Figure 4:
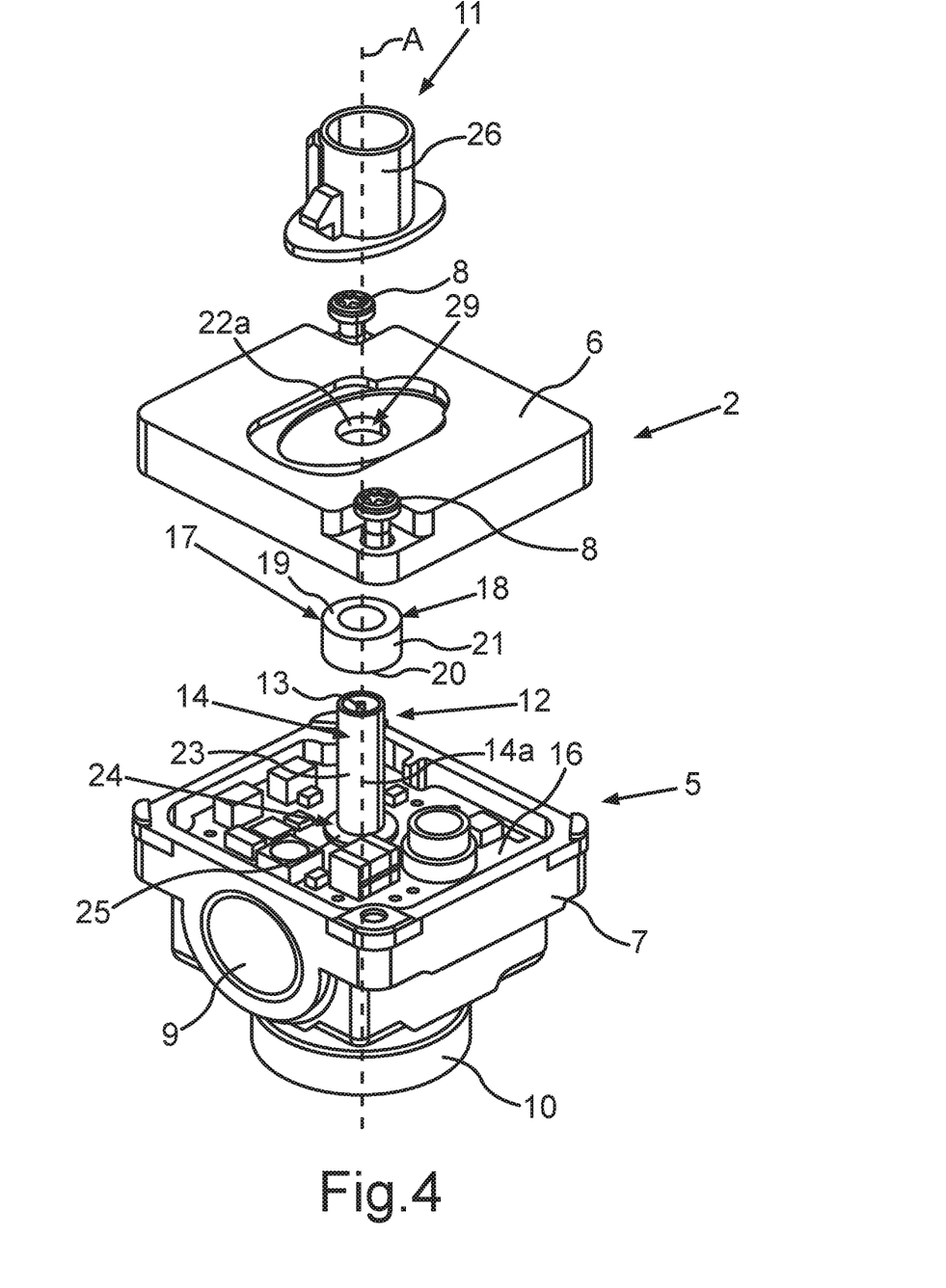
FIG. 4 a schematic exploded illustration of the camera with an opened housing, which includes a first housing part and a second housing part, and a connecting device.

FIG. 4 shows the embodiment of the camera 2 according to FIG. 2 in an exploded illustration. Here, the first housing part 6 and the second housing part 7 are opened. A circuit board 16 is disposed within the housing 5. The coaxial plug 12 with the inner conductor 13 and the outer conductor 14 is disposed on the circuit board 16. According to the embodiment, the outer conductor 14 is connected to a ground potential of the camera 2. In order that the first housing part 6 is also electrically connected to the ground potential of the camera 2, a connecting device 17 is provided, which surrounds the outer conductor 14 in the assembled state of the camera 2.

The connecting device 17 according to FIG. 4 comprises a rubber piece 18. The rubber piece 18 is made of an electrically conductive rubber. The rubber piece 18 is formed as a single piece. It is formed as a solid body that is free of voids. The rubber piece 18 is configured in the form of a ring or a tube piece. It is a hollow cylinder. Through this axial cut-out the outer conductor 14 extends. The rubber piece 18 has a top side 19. The top side 19 forms a front side. This top side 19 extends in a plane, which is oriented perpendicular to a longitudinal axis A of the camera 2. The top side 19 thus represents a ring surface. Moreover, the rubber piece 18 has a rear side 20 opposing the top side 19 in axial direction. Also this is a ring surface. This rear side 20 is oriented in particular in parallel to the top side 19. Same is also configured in a plane, which is oriented perpendicular to the longitudinal axis A. Moreover, the rubber piece 18 comprises a barrel wall 21. The barrel wall 21 is entirely parallel to the longitudinal axis A, in particular across the entire height.

In the mounted state of this rubber piece 18 an interior side, which bounds the cut-out of the rubber piece 18, directly contacts the outer side 14a of the outer conductor 14.

The outer conductor 14 has a first partial element 23 and a second partial element 24. The first partial element 23 has a smaller outer radius than the second partial element 24. Thus, the second partial element 24 disposed closer to the circuit board 16 than the first partial element 23 has a contact area 25. The contact area 25 is that part of the second partial element 24, which is located in the main extension direction of the circuit board 16 and thus is formed radially to the coaxial plug 12.

If the housing 5 is now closed by moving the first housing part 6 and the second housing part 7 towards each other, thus, the connecting device 17 abuts the contact area 25 of the second partial element 24 with the back side 20 and abuts the first housing part 6 or the inner side, thus the side of the first housing part 6 facing the circuit board 16, with the barrel wall 21. By the abutment of the back side 20 and the barrel wall 21, upon further approach of the first housing part 6 to the second housing part 7, an axial force is exerted on the connecting device 17 with respect to the coaxial plug 12.

In the assembled state of the camera 2, the rubber piece 18 thus establishes the electrical connection between the outer conductor 14 and the first housing part 6. Thus, the first housing part 6 is also electrically connected to the ground potential of the camera 2. Therefore, the first housing part 6 acts shielding with respect to electromagnetic radiation.

In the assembled state, the first housing part 6 is electrically conductively connected to the second housing part 7 by means of the screw 8 according to the embodiment. Thus, there is also an electrical connection between the second housing part 7 and the ground potential of the camera 2. Thus, the second housing part 7 in particular also acts shielding with respect to electromagnetic radiation. Preferably, the housing 5 thus acts completely shielding with respect to electromagnetic radiation.

Figure 5:
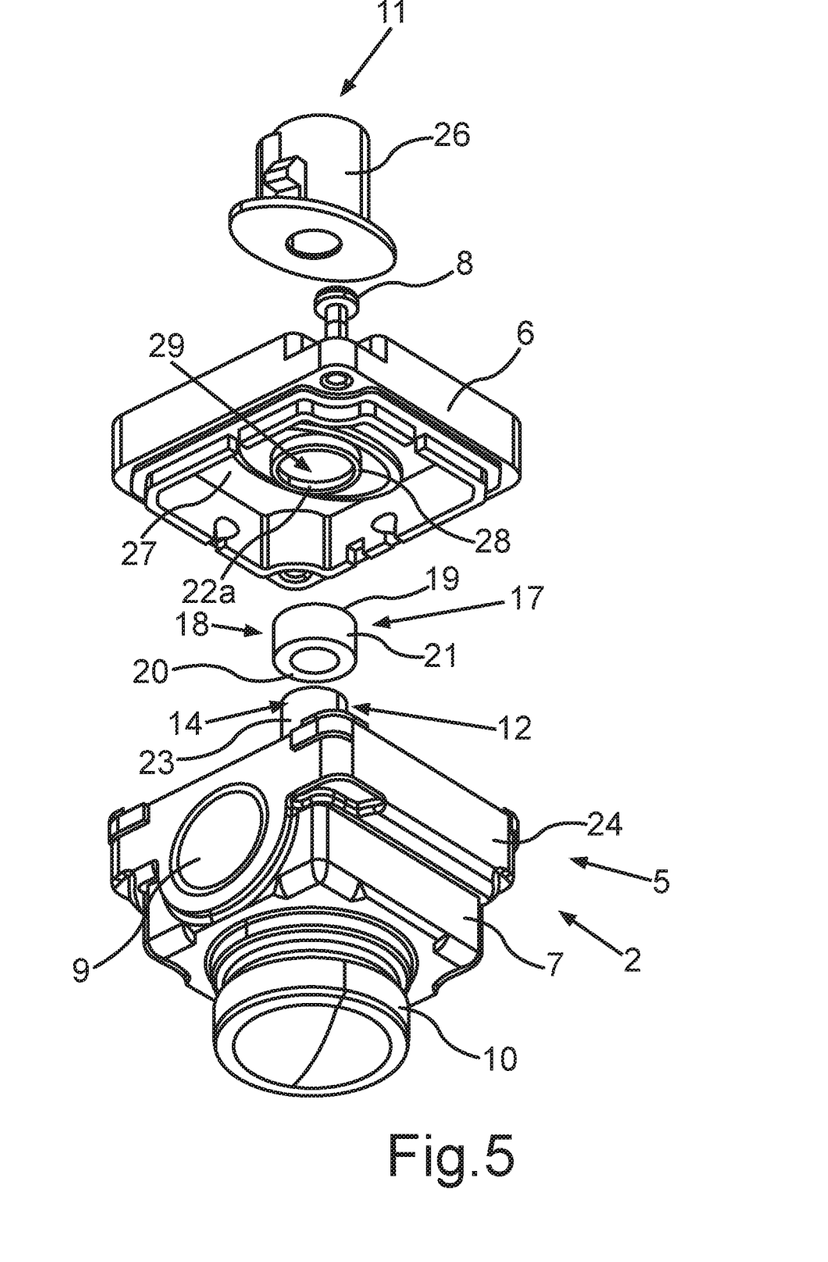
FIG. 5 a schematic exploded illustration of the camera analogously to FIG. 4, but from another perspective.

FIG. 5 shows the camera 2 analogously to FIG. 4 from another perspective. From the other perspective, an inner side 27 of the first housing part 6 is shown, which faces the circuit board 16. On the inner side 27 of the first housing part 6, according to the embodiment, a receiving element 28 is present. In the receiving element 28, the connecting device 17 can be disposed in certain areas. The connecting device 17 is disposed in the receiving element 28 in particular with the upper part of the rubber piece 18. Thus, the electrical connection between the first housing part 6 and the connecting device 17 can be provided. The receiving element 28 is abutted around a housing opening 29 of the first housing part 6. The coaxial plug 12 is led out of the interior of the camera 2 or the housing 5 through the housing opening 29.

Figure 6:
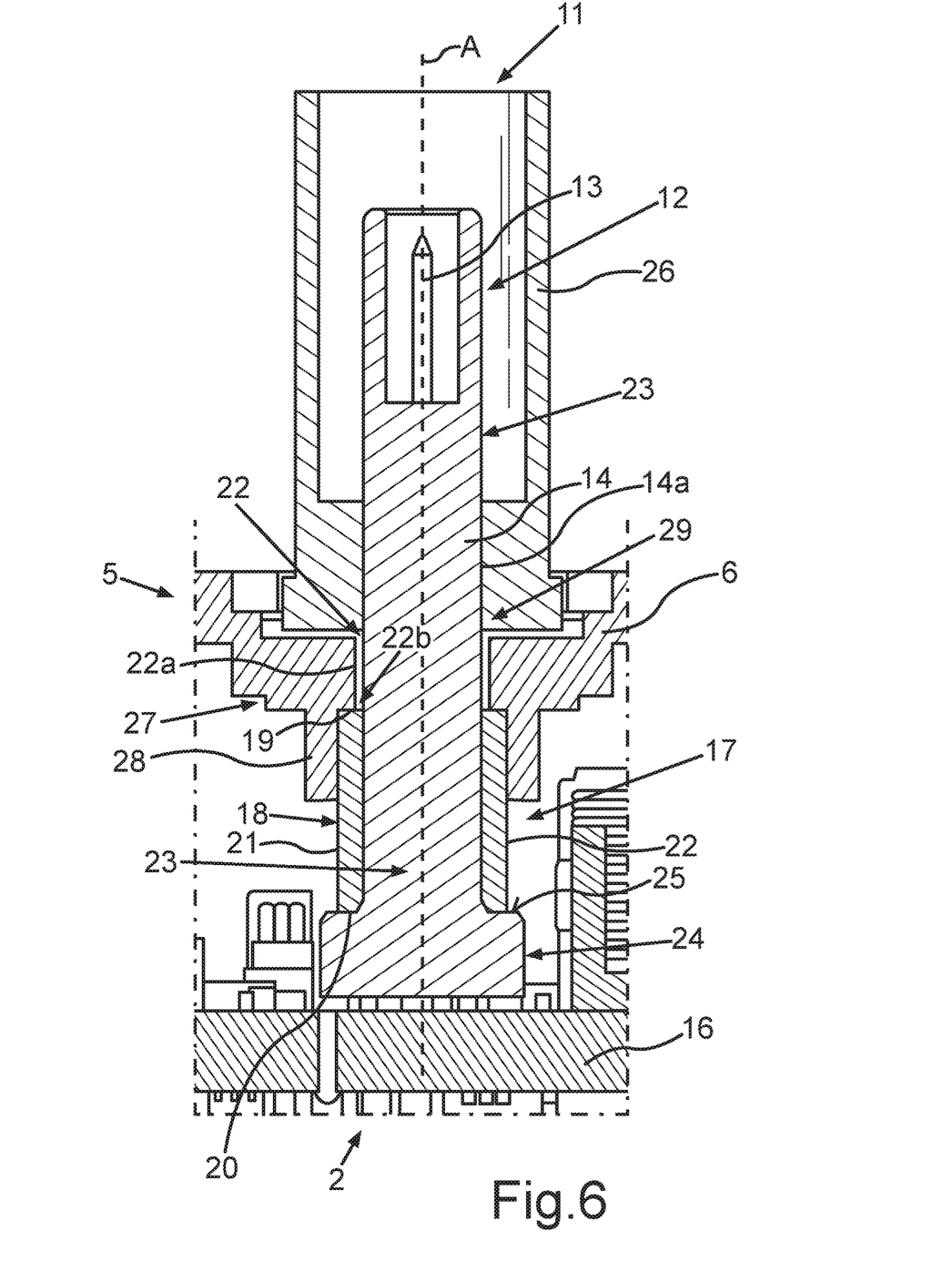
FIG. 6 a schematic sectional illustration of the camera analogously to FIG. 2, wherein the connecting device is electrically connected to an outer conductor of the interface device and the housing.

FIG. 6 shows a sectional illustration analogously to the embodiment of FIG. 2. The first housing part 6 and the second housing part 7 are combined such that the housing 5 is closed. The connecting device 17 is now applied with an axial force with respect to the coaxial plug 12.

As can be further seen in FIG. 6 between the outer side 14a of the outer conductor 14 and a boundary wall 22a bounding the opening 29 for extending the outer conductor 14 through it, a gap 22 is formed. This gap 22 is covered at an axial gap end 22b by the rubber piece 18, in particular fully covered. In particular this is effected by the top side 19 of the rubber piece 18.

The invention claimed is:

1. A camera for a motor vehicle, comprising:
a housing configured to shield electromagnetic radiation at least in certain areas, including a circuit board disposed in the housing;
an interface device for connecting the camera to the motor vehicle, wherein the interface device is electrically connected to the circuit board and comprises a coaxial plug with an inner conductor and an outer conductor; and
a connecting device for electrically connecting the outer conductor to the housing, the connecting device comprising at least one separate and electrically conductive rubber piece, which is arranged between the outer conductor and the housing and contacts the outer conductor and the housing directly,
wherein the outer conductor outwardly extends through an opening in the housing and bounds a boundary wall of the housing,
wherein the boundary wall bounds the opening and is arranged at a radial distance from an outer side of the outer conductor so that a gap between the boundary wall and the outer side is formed, and
wherein the rubber piece comprises a top side facing the gap, which directly contacts an axial end of the gap so that the gap is completely covered toward the interior of the housing by the top side.

2. The camera according to claim 1, wherein the rubber piece is configured as fully circumferential ring, in particular as a hollow cylinder.

3. The camera according to claim 2, wherein the ring across its entire height, which is measured in the direction of the longitudinal axis of the coaxial plug, comprises an axially oriented barrel wall.

4. The camera according to claim 1, wherein the rubber piece across its entire axial height surrounds the outer conductor and across its entire height directly contacts one outer side of the outer conductor.

5. The camera according to claim 1, wherein the rubber piece sits on a socket-like partial element of the outer conductor and is contacted with an electric contact surface of the socket-like partial element.

6. The camera according to claim 1, wherein the rubber piece is configured as solid body.

7. A motor vehicle with a camera according to claim 1.

* * * * *